April 1, 1952

B. D. GILLE 2,590,956

VOICE AND VISUAL RECORDER

Filed Aug. 25, 1947

INVENTOR.
BENSON D. GILLE
BY Herbert E. Metcalf
Attorney

Patented Apr. 1, 1952

2,590,956

UNITED STATES PATENT OFFICE 2,590,956

VOICE AND VISUAL RECORDER

Benson D. Gille, Los Angeles, Calif.

Application August 25, 1947, Serial No. 770,529

2 Claims. (Cl. 343—6)

My invention relates to voice and visual recorders as are readily adaptable for simultaneously recording visual and aural information during aerial navigation of aircraft, particularly during a blind landing procedure.

For record purposes, it is highly desirable to provide for use, in conjunction with radio navigational aids for aircraft such as ground control approach equipment, for example, a means and method of recording the landing procedures and instructions issued by the ground controller to the landing aircraft. Furthermore, it is equally desirable to record the pilot's responses to such instructions, both as to the pilot's voice and as to the position of the aircraft as provided by ground radar installations. All of the records, visual and sound, must, in addition, be permanently synchronized in such a manner that, upon playback, a complete, coherent account of the landing is presented in such a manner that no possible misinterpretation can be placed on the record. This latter requirement practically demands that both the voice and the radar information be placed on the same recording medium, which in the present invention is to be, in its preferred form, 35 mm. motion picture film.

The use, however, of 35 mm. motion picture film to record the voice and the radar information in the customary manner, using the customary recording film speeds, involves too great a film consumption for practical use, and as far as the picture frequency is concerned would provide more frequent pictures than would be necessary for record purposes. It is an object of the present invention to provide a means and method of recording voice and sound on a single film so that voice recording and picture frequency will be satisfactory for record purposes and which will provide sufficient film economy to make the system practical for permanent record use.

Another object of the invention is to provide a permanent, economical film record of a ground controlled approach system (hereinafter referred to as G. C. A.) without interference with the normal operation thereof.

The visual information supplied by G. C. A., in its usual instrument assembly, comprises the showing of the aircraft position by radar on a plan-position indicator (hereinafter called P. P. I.) and an altitude-azimuth indicator (hereinafter called az-el), although the P. P. I. is not essential to the efficient operation of the system. When these instruments are simultaneously viewed, together with a clock face, the G. C. A. personnel can "talk down" an aircraft into a landing field by constantly watching the position of the aircraft and then verbally giving instructions to the pilot in accordance with the aircraft distance (P. P. I. indication), altitude, and azimuth (az-el indication) together with time indication until by properly following instructions the pilot makes a safe landing on the desired airstrip. It is only when improper instructions are given or improper pilot response is made to proper instructions that accidents can occur, and it is in the analysis of such failures that the present invention becomes invaluable. Thus, as only in isolated cases will permanent record be consulted, economy of the recording medium is clearly required.

In broad terms as to method, I record a simultaneous picture of the P. P. I., az-el, and clock indications on a photographic medium such as 35 mm. motion picture film. The pictures are smaller than ordinarily would be placed on such film, similar in size, for example, to a 16 mm motion picture frame. The pictures are spaced several frames apart such as, for example, spaced three frames. The film is then run through in one direction with continuous sound recording. At the end of the film roll, the direction of film travel is reversed and indexing is accomplished to place the new pictures between the previous exposures, and to place the new sound track alongside the previous recording. Again, at the end of the roll in the other direction, the direction of film travel is again reversed and a new indexing made until the unused picture frames between the original exposures are full, and the unused space on the side of the picture frames are filled with parallel sound track exposures. Thus, for example, in a 1,000-foot roll of film approximately 4,000 feet of sound track can be obtained with one-fourth the usual number of pictures that would normally accompany a linear unit of sound track. In this way, proper speed of film travel for sound recording can be maintained with a very substantial saving in film consumption.

Other objects and advantages of the present invention will be more fully understood by reference to the appended drawings showing diagrammatically one form by which the method of my invention can be practiced.

Figure 3:
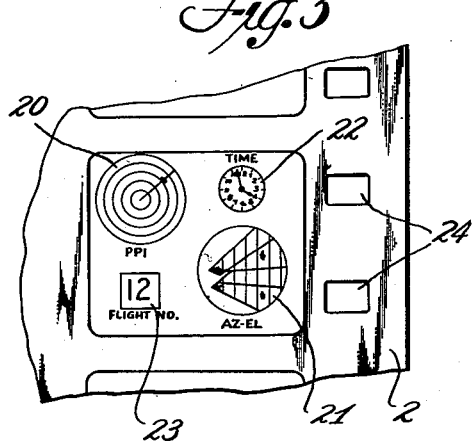

Figure 3 is a diagram of a single picture showing P. P. I., az-el, time, and flight number indications.

Figure 1:
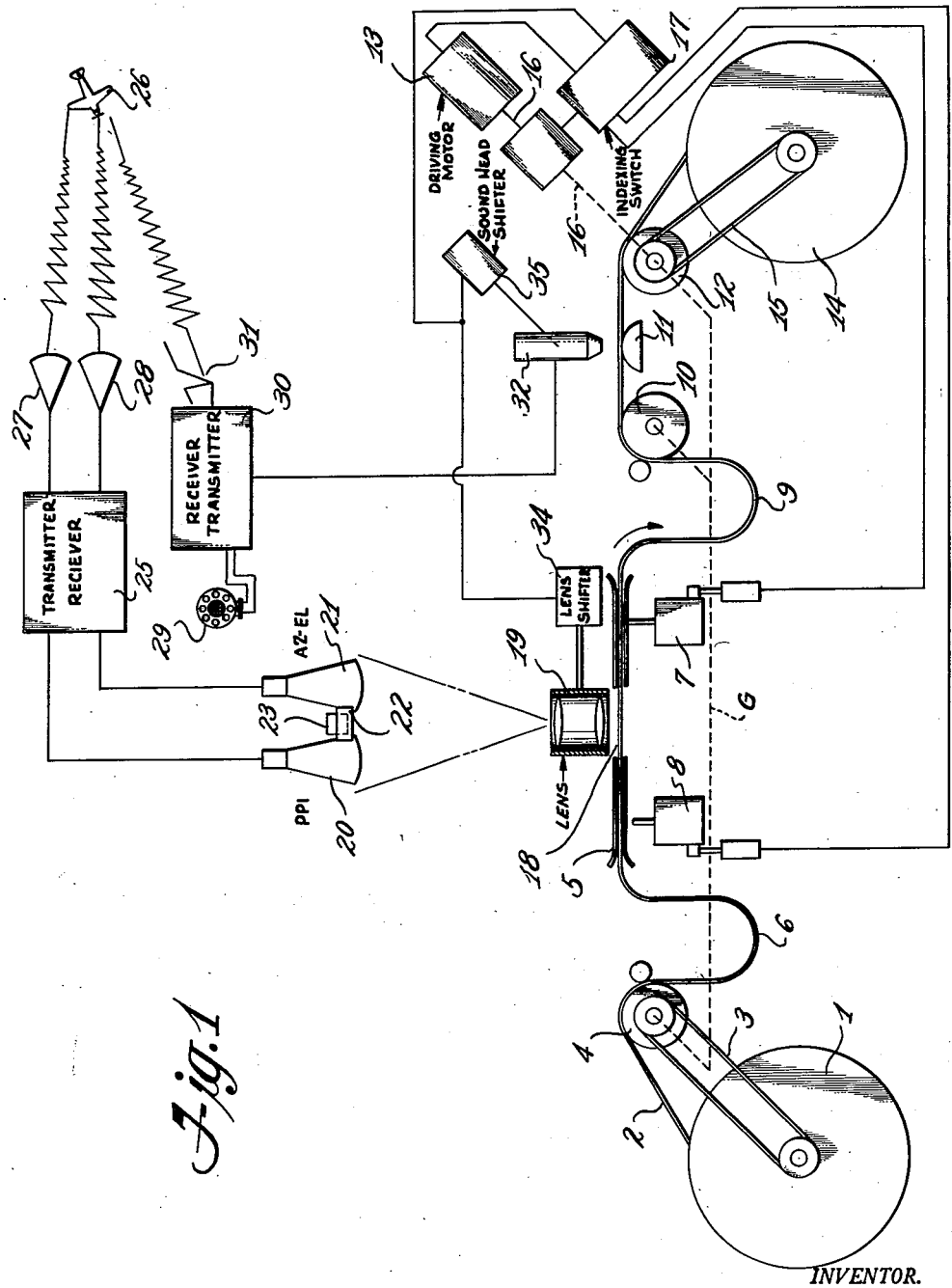
Figure 1 is a diagram of a voice and visual film recorder embodying the present invention.

Referring first to Figure 1 and reading from left to right, a film reel 1 capable of holding, for example, a 1000-foot roll of 35 mm. standard motion picture film 2, is mounted to be rotated by a friction belt 3 from a continuously driven sprocket 4, driven as will be described later. The film 2 then passes into a friction gate 5 via a loop 6. In gate 5 the film is intermittently progressed in one direction by intermittent drive 7 and in the opposite direction by a second intermittent drive 8 controlled as will be later pointed out. Leaving gate 5, the film passes into a second loop 9 onto a recording sprocket 10 then over a spacing block 11 and then over a second recording sprocket 12, both being geared together and to sprocket 4, as indicated by broken line G and driven by driving motor 13. The film then leaves second recording sprocket 12 to enter a second reel 14, also driven frictionally from second recording sprocket 12 as by belt 15.

Shaft 16 of driving motor 13 is connected to an indexing switch 17 whose function is later to be described.

Gate 5 is provided with a picture aperture 18 longer than required for a single picture, being, for example, four 16 mm. frames long. Positioned over aperture 18 is a lens 19 focused on a P. P. I. cathode ray tube 20, an az-el tube 21, a clock 22, and a flight number indicator 23 to produce a picture, in this instance of standard 16 mm. size as shown in Figure 3. The 16 mm. pictures are preferably placed close to the perforations 24 on one side of the 35 mm. film, leaving the remainder of the width of the film free for sound track recording. The P. P. I. and az-el tubes are energized from the usual G. C. A. transmitter and receiver 25 transmitting to and receiving energy from aircraft 26 through radiator-antennae 27 and 28, respectively.

The G. C. A. operator communicates with aircraft 26 by voice using microphone 29, transmitter-receiver 30 and radiator 31.

Figure 2:
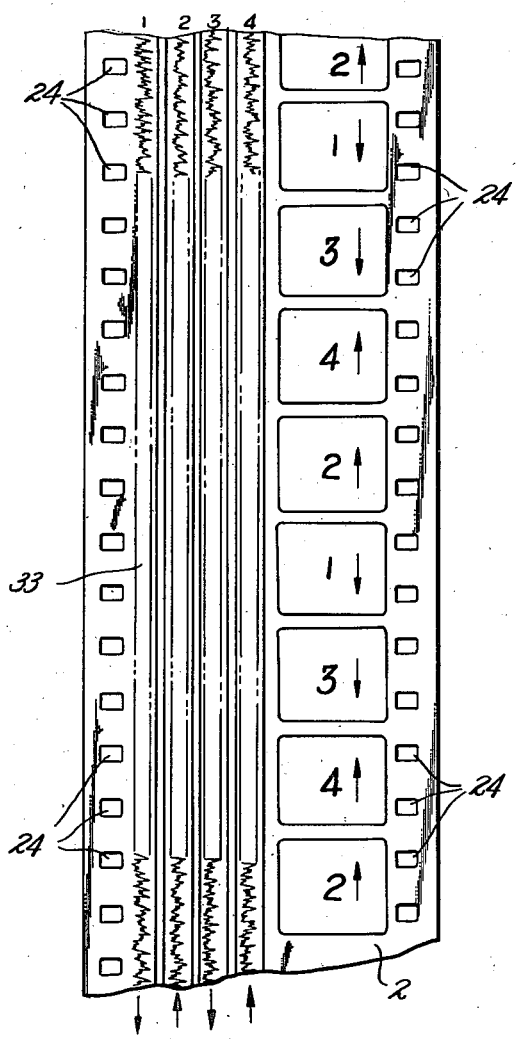
Figure 2 is a diagram showing successive picture sequences and corresponding parallel sound tracks as recorded by the device of Figure 1.

All signals through voice transmitter-receiver 30 are passed to a recording head 32 positioned to photographically record the signals on film 2 as it passes continuously over spacing block 11 either as a variable area, or variable density sound track 33 (Figure 2). Lens 19 is indexed lengthwise of film 2 by lens shifting relay 34 and recording head 32 is indexed crosswise of film 2 by recording head shifting relay 35 under control of signals from indexing switch 17.

Indexing switch 17 may, for example, consist of a footage meter set to reverse driving motor 13 when the end of the 1,000-foot roll is approached in either direction. Contacts are set up, as is well known in the art, to make connections to operate shifting relays 34 and 35 at each end of film travel to place the pictures in the proper sequence, and the sound tracks side by side, as shown in Figure 2. Indexing switch 17 is also connected to intermittent drives 7 and 8 to energize them for proper directional operation in accordance with the direction of drive of motor. Indexing takes place sufficiently fast that no significant sound is lost.

In operation, the camera lens 19 is focused on the P. P. I., az-el tubes, clock, and flight number of the standard G. C. A. equipment with a field of view large enough to accommodate the lens shift, and with a view path that cannot be interfered with by the G. C. A. operating personnel, so that they are free to operate normally. The film, placed of course in a light tight magazine following standard recording camera practice, is all on one reel except for the threading and connection to the other reel. When G. C. A. procedure is started the recorder is started, and recording of both radar indications and voice signals continues until the landing instructions cease. Thus, a complete, permanent aircraft position, instructions and pilot response record is made on a single recording medium in such a manner that synchronization is absolute.

Further preferred conditions can be set up for extreme film economy. For example, good voice recordings can be made at a film speed of 20 feet per minute, which, with consecutive pictures spaced three 16 mm. frames, provides a picture frequency of 200 frames per minute or 3.33 frames per second which is ample for position recording. Under these conditions, approximately 4,000 feet of sound track will be exposed which provides a complete recording time of 3 hours, 20 minutes, with only 1,000 feet of film being used. By utilizing smaller pictures (such as 8 mm. frames), removing the perforations from one side of the 35 mm. film and spacing the pictures by the number of frames less one than the number of sound tracks, twelve sound tracks can be recorded, with a recording time of over 10 hours for 1,000 feet of 35. mm film.

It is to be noted that the pictures of the cathode ray tubes can be taken with a shutter (not shown) synchronized with the sweep period of the cathode ray beam using a fluorescent material on the cathode ray tube screen, such material having a light persistency sufficient to hold until the picture sweep is completed. Or, if desired, no shutter need be used but instead the cathode ray tube can be blanked out during film movement.

A play-back reproducer for the completed film record (after photographic development) is preferably constructed as far as the mechanical drive is concerned exactly the same as the recorder above described. A projection lens with projection lamp and condensers is, of course, substituted for the camera lens 19 with the projection head thus formed indexed as described for the recorder. Similarly, a light source and photoelectric pickup is substituted for the recording head and is indexed simultaneously with the projection head. By making loop 9 on the reproducer the exact number of sprocket holes long as was used in recording, the synchronism of voice and picture will be exactly the same in reproduction as in recording with no possibility of misinterpretation of conditions, as might well occur in separate picture and voice records even when sync marks are used thereon.

I have thus been able to utilize a single recording strip for both picture and voice recording in exact synchronism; I have been able to maintain voice quality by utilizing a long effective film travel per picture frame; and, in consequence, I have been able to achieve extreme film economy to the point where 1,000 feet of film can be used for more than a three-hour record. By the means and method described above, the use of standard motion picture film has been made economically practical.

While I have seen fit to describe my invention as applied to a G. C. A. recording and in a preferred apparatus form, equivalent means will, of course, be apparent to those skilled in the art or through the scope of the appended claims.

I claim:

1. In a ground controlled approach system for a piloted airplane wherein radar equipment is provided to visually and continuously indicate information such as the instantaneous position of said airplane, in relation to a desired line of flight, and other relevant data, the combination of a film strip, means for moving said strip intermittently and continuously over a path, voice transmitting and receiving equipment both on the ground and in said airplane, sound recording means positioned to record a first sound track on said strip in the continuous motion portion of said path, said sound recording means being responsive to said voice transmitting and receiving equipment on the ground, picture image recording means positioned to record first a set of pictures on said strip in the intermittent motion portion of said path, said pictures comprising images of said visual information indicated and recorded simultaneously with the co-existing sound, the width of said images being less than the width of the usable portion of said strip by a space sufficient to contain a plurality of side-by-side sound tracks, means for spacing the images of said set along the length of said strip with a number of image lengths between successively recorded images, said number equalling one less than said plurality, means acting to reverse said film strip when a predetermined point close to each end thereof is reached, and indexing means acting simultaneously with said reversing means to index said sound recording means laterally of said strip to produce successive sound tracks parallel to said first sound track, and to index said image recording means lengthwise of said strip to record additional sets of pictures between the images of prior recorded sets.

2. Apparatus in accordance with claim 1 wherein said means for moving said film strip include a reversible electric motor and a pair of opposite-direction intermittent film drive assemblies, wherein switching means is provided as part of said indexing means and said reversing means, said switching means having a driven connection with said motor, said reversing means including contacts in said switching means adapted to alternately energize said intermittent film drive assemblies and to reverse said motor, said indexing means including a sound recording shifting relay and a picture recording shifting relay both operatively connected to said switching means, wherein at least four sound tracks and four sets of images are provided on said strip, the picture repetition rate being substantially less than that required for persistence of vision between successively recorded pictures, and wherein the image size and shape are independent of the number of picture sets and sound tracks to be recorded on a given strip.

BENSON D. GILLE.

REFERENCES CITED

The following references are of record in the file of this patent:

UNITED STATES PATENTS

| Number | Name | Date |
|---|---|---|
| 2,293,899 | Hanson | Aug. 25, 1942 |

FOREIGN PATENTS

| Number | Country | Date |
|---|---|---|
| 456,791 | Great Britain | Nov. 16, 1936 |
| 637,962 | Germany | June 15, 1932 |

OTHER REFERENCES

Scientific American, May 1946, page 205.